United States Patent
Ekkel et al.

(10) Patent No.: US 11,751,315 B2
(45) Date of Patent: Sep. 5, 2023

(54) CONTROL DEVICE FOR LIGHTING

(71) Applicant: SIGNIFY HOLDING B.V., Eindhoven (NL)

(72) Inventors: Jan Ekkel, Eindhoven (NL); Harry Broers, Eindhoven (NL); Kumar Arulandu, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 59 days.

(21) Appl. No.: 17/624,605

(22) PCT Filed: Jun. 18, 2020

(86) PCT No.: PCT/EP2020/066911
§ 371 (c)(1),
(2) Date: Jan. 4, 2022

(87) PCT Pub. No.: WO2021/001159
PCT Pub. Date: Jan. 7, 2021

(65) Prior Publication Data
US 2022/0264734 A1    Aug. 18, 2022

(30) Foreign Application Priority Data
Jul. 4, 2019 (EP) .................................. 19184486

(51) Int. Cl.
*H05B 47/195* (2020.01)
*H05B 47/11* (2020.01)

(52) U.S. Cl.
CPC ........... *H05B 47/195* (2020.01); *H05B 47/11* (2020.01)

(58) Field of Classification Search
CPC ...... H05B 47/195; H05B 47/11; H05B 47/19; Y02B 20/40
See application file for complete search history.

(56) References Cited

U.S. PATENT DOCUMENTS

| | | | |
|---|---|---|---|
| 2012/0001841 A1 | 1/2012 | Gokingco et al. | |
| 2016/0192458 A1* | 6/2016 | Keith | H05B 41/39 315/291 |
| 2018/0027636 A1 | 1/2018 | Turvy, Jr. et al. | |
| 2021/0001841 A1 | 1/2021 | Wang et al. | |
| 2022/0299190 A1* | 9/2022 | Chemel | H05B 47/19 |

FOREIGN PATENT DOCUMENTS

WO    2015049412 A1    4/2015

* cited by examiner

*Primary Examiner* — Daniel D Chang

(57) ABSTRACT

The invention provides a control device for controlling at least one wirelessly connected lighting device within a wireless network, wherein the control device comprises: a transceiver configured to overhear and transmit a message within the wireless network; a light sensor configured to detect a light signal comprising a temporal characteristic that is characteristic for a first artificial light source; a processor operatively coupled to the light sensor and the transceiver, wherein the processor is configured to: determine, based on analyzing said temporal characteristic, a first condition that the light signal belongs to the of artificial light source, and transmit a control message to the at least one wirelessly connected lighting device upon determining said first condition.

13 Claims, 3 Drawing Sheets

CONTROL DEVICE FOR LIGHTING

CROSS-REFERENCE TO PRIOR APPLICATIONS

This application is the U.S. National Phase application under 35 U.S.C. § 371 of International Application No. PCT/EP2020/066911, filed on Jun. 18, 2020, which claims the benefit of European Patent Application No. 19184486.9, filed on Jul. 4, 2019. These applications are hereby incorporated by reference herein.

FIELD OF THE INVENTION

The invention relates to a control device for controlling at least one wirelessly connected lighting device within a wireless network. The invention further relates to a system, wherein the system comprises a wireless network comprising at least one wirelessly connected lighting device and such a control device. The invention further relates to a method of controlling at least one wirelessly connected lighting device within a wireless network; and a computer program product performing such a method.

BACKGROUND OF THE INVENTION

Wirelessly connected lighting devices (or: smart lighting) may be operated by wireless switches, schedules, sensors, smartphones and/or other smart devices. For example: Philips Hue bulbs have wireless connectivity and operate within a wireless network. A Philips Hue motion sensor, which comprises a PIR sensor for detecting motion and a light sensor for measuring ambient light levels, may also be part of said wireless network. Thereby, said Philips Hue motion sensor may control the Philips Hue bulbs depending on detected motion, but also in dependence of a current ambient light level.

However, controlling wirelessly connected lighting devices with such a light sensor may be disadvantageous and prone to limitations, because such a light sensor may e.g. not be configured to differentiate between artificial light and natural light. Therefore, the lighting industry experiences an ongoing pull to find new solutions and improved applications for controlling wirelessly connected lighting devices with a light sensor. One example thereof may be found in US2016/192458A1.

SUMMARY OF THE INVENTION

It is an object of the invention to provide an improved control device for controlling at least one wirelessly connected lighting device within a wireless network, which at least alleviates the problems and disadvantages mentioned above. Thereto, the invention provides a control device for controlling at least one wirelessly connected lighting device within a wireless network, wherein the control device comprises: a transceiver configured to overhear and transmit a message within the wireless network; a light sensor configured to detect a light signal comprising a temporal characteristic that is characteristic for a first artificial light source; a processor operatively coupled to the light sensor and the transceiver, wherein the processor is configured to: determine, based on analyzing said temporal characteristic, a first condition that the light signal belongs to the first artificial light source, determine, by overhearing the wireless network with the transceiver, a second condition that no message is transmitted within the wireless network within a time period prior to the moment of detecting said light signal, and transmit the control message to the at least one wirelessly connected lighting device upon determining said first condition and said second condition.

Each particular (type of) artificial light source may emit a light signal comprising a temporal characteristic particular to that type of artificial light source; e.g. because each particular (type of) artificial light source may comprise a unique powering behavior (e.g. start-up behavior) and therefrom resulting (temporal) artefacts in the emitted light. Said light source may be a lighting device.

Hence, said temporal characteristic is characteristic for an artificial light source and in particular to a first type of artificial light source. The analysis of said temporal characteristic enables the processor to determine a first condition that the light signal belongs to a first (type of) artificial light source, and based thereon control the wirelessly connected lighting device. The control device according to the invention is thereby not only configured to differentiate between artificial light and natural light, but also able to identify the light signal originates from a first (type of) artificial light source.

Therefore, the present invention provides new and advantageous solutions for controlling wirelessly connected lighting devices based on a differentiation between artificial light and natural light, and in particular provide such a control based on the artificial light source determined via the detected light signal. A wirelessly connected lighting device may for example be controlled based on detecting a particular (type of) artificial light source turning on. Thereby, said first (type of) artificial light source may e.g. be various types of a LED light sources, an incandescent lighting device, a fluorescent tube, or a halogen spot.

In a further embodiment, the at least one wirelessly connected lighting device may be a second (type of) artificial light source, wherein the first (type of) artificial light source and the second (type of) artificial light source are different. Hence, a wirelessly connected lighting device may be a second (type of) artificial light source, and may be controlled based on detecting a different first (type of) artificial light source turning on. For example: said first artificial light source may be an incandescent bulb while said second artificial light source may be a LED light source; said first artificial light source may be a fluorescent tube while said second artificial light source may be a LED light source; said first artificial light source may be a Switch Mode Power Supply (SMPS) operated LED light source while said second artificial light source may be a Pulse Width Modulated (PWM) LED light source; said first artificial light source may be a phase-cut operated light source while said second artificial light source may be a Pulse Width Modulated (PWM) LED light source.

Furthermore, installed lighting systems often comprise a set of different types of lighting devices, which respectively constitute different types of artificial light sources. For example, in a domestic setting, households often install a network of wirelessly connected lighting devices in addition to their conventional wall-switched non-connected lighting devices. Because the control of wirelessly connected lighting devices and the control of non-connected lighting devices may require two separate controlling means, such installed lighting systems may be cumbersome and less ergonomic.

Hence, to alleviate such problems and disadvantages, as mentioned before, the processor may be configured to: determine, by overhearing the wireless network with the transceiver, a second condition that no message is transmitted within the wireless network within a time period prior to the moment of detecting said light signal, and transmit the control message to the at least one wirelessly connected lighting device upon determining said first condition and said second condition.

Such an feature may enable controlling a wirelessly connected lighting device based on detecting a non-connected lighting device. Namely, the non-connected lighting device is a first (type of) artificial light source, and may e.g. not belong to the wireless network of the at least one wirelessly connected lighting device. For example, the control device according to the invention may detect a light signal of a non-connected incandescent bulb turning on, and based thereon control the wirelessly connected lighting device within the lighting network; (based on the insight that no control message has been sent over the network, thereby ensuring that the detected light signal originates from a light source which is non-connected within the wireless network and belongs to a first (type of) artificial light source).

In an embodiment, said time period may be at most one second. Such a time period of at most one second, or alternatively at most 0.5 second, may be sufficiently large to detect whether or not a control message has been sent over the wireless network to control a device in said network (e.g. to the at least one wirelessly connected lighting device), also taking into account possible processing delays in control (due to alternative tasks); thereby ensuring that the detected light signal originates from a first artificial light source and may not be part of the wireless network. In an embodiment, said time period may be at most 50 millisecond, or alternatively be at most 1 millisecond.

Further, in aspects, the processor may be configured to: determine, by overhearing the wireless network with the transceiver, another condition that no message is transmitted to the at least one wirelessly connected lighting device within the wireless network within a time period prior to the moment of detecting said light signal, and transmit the control message to the at least one wirelessly connected lighting device upon determining said first condition and said second condition.

Further or alternatively, in aspects, the processor may be configured to: determine, by polling a controlling device within the wireless network with the transceiver, another condition that no message is transmitted to the at least one wirelessly connected lighting device within the wireless network within a time period prior to the moment of detecting said light signal, and transmit the control message to the at least one wirelessly connected lighting device upon determining said first condition and said second condition. Said controlling device may e.g. be a bridge device or a master switch.

In an embodiment, the control message may comprise a command to turn on or off the at least one wirelessly connected lighting device. Such an embodiment may be advantageous to control a wirelessly connected lighting device within a wireless network to turn on or off based on detecting e.g. a connected or non-connected lighting device of a first artificial light source.

Furthermore, the control message may comprise other lighting commands for controlling the at least one wirelessly connected lighting device. Hence, in an embodiment, the control message may comprise a command to adapt a light property of the at least one wirelessly connected lighting device. In an embodiment, said light property may be at least one of: a light intensity, a light spectrum, a color, a color temperature, and/or a light scene.

Moreover, the control device may also control the at least one wirelessly connected lighting device within the wireless network to copy the properties of the detected light signal. Namely, in an embodiment, the light signal may comprise a first light property; wherein the processor may be configured to determine said first light property of the light signal; wherein the control message may comprise a command to adapt the light property of the at least one wirelessly connected lighting device to the first light property of the light signal. Thereby, in an embodiment, said first light property may be at least one of: a light intensity, a light spectrum, a color, a color temperature, and/or a light scene.

As mentioned, the first artificial light source may be detected by analyzing the temporal characteristic. The temporal characteristic may be a fluctuation of a light level of the light signal. Hence, in an embodiment, the temporal characteristic may comprise at least one fluctuation of a light level at a particular frequency. For example, an activation of a particular (e.g. type of) artificial light source may be detected by the fluctuation of the light level, which may either be at a low frequency related to the 50 or 60 Hertz of the power grid, or as high as 300 Kilohertz related to power characteristics originating from the LED driver. Moreover, conventional fluorescent light bulbs may typically flicker at twice the mains frequency. Moreover, power electronics in a LED bulb may use Switch Mode Power Supply (SMPS) circuits that may operate typically in the range from 30 Kilohertz to 4 Megahertz. Moreover, dimming of LED bulbs using Pulse Width Modulation (PWM) in the frequency range between 200 Hertz to 100 Kilohertz may result in a current ripple that results in a fluctuation of the light level of the corresponding emitted light signal.

Moreover, the temporal characteristic may additionally or alternatively be a shape of the power signal. For example: Incandescent lamps may produce sinusoidal waveforms while light sources with electronic ballast may produce saw tooth type of waveforms. Hence, in an embodiment, the temporal characteristic may be a saw tooth type of waveform, or a smooth sinusoidal waveform.

Thus, in an embodiment, the particular frequency may be at least one of: a rectified mains frequency, a frequency of 50 Hertz, a frequency of 60 Hertz, a frequency between 100 Hertz and 120 Hertz, a frequency between 30 Kilohertz and 1 Megahertz, a frequency between 200 Hertz and 100 Kilohertz, and/or a frequency between 300 Hertz and 100 Kilohertz.

Further, it is noted that LED bulbs may be optimized on costs. Therefore, often a single stage power converter is used to convert the input power to the LED bulbs. Such a single stage power converter may typically have a power fluctuation of twice the mains frequency due to rectification of the sinusoidal input voltage to the output stage that contains a buffer capacitor to which the LEDs are connected in parallel. As a result, these LED bulbs will typically emit a ripple current with twice the mains frequency. These ripples (or: fluctuations) can be visible in the emitted resulting light (signal) and may even be perceived as uncomfortable. Therefore, high end LED bulbs overcome these stroboscopic effects by implementing a more advanced circuit, e.g. dual stage power converter, valley-fill, etc. In such improved cases, the emitted resulting light may have limited to none-noticeable stroboscopic light effects such as flicker. Such LED bulbs may then comprise a higher switching frequency of components. Therefore, the former LED bulbs with the uncomfortable artefacts and the latter LED bulbs with improved comfort may even be distinguishable by means of detecting their respective light signal; for example, by assessing their start-up behavior.

In an embodiment, the temporal characteristic may comprise an increasing slope in light level towards a maximum light level while the light level is fluctuating at a particular frequency. Alternatively, the temporal characteristic may comprise a decreasing slope in light level towards a minimum light level while the light level is fluctuating at a particular frequency. Such an increasing slope may be indicative of a startup behavior of the respective artificial light source. Thus, in an embodiment, the temporal characteristic may be indicative for a start-up behavior of the first artificial light source. Such a start-up behavior is not essential to detect the first type of the lamp.

In an embodiment, the control device may be a light switch, a wall switch, a sensor device, or a bridge device. In an embodiment, the wireless network may be one of: a ZigBee network, a Bluetooth network, a Wi-Fi network, a mobile network, a Lo-Ra network, an optical communication network, and/or an UWB network.

It is a further object of the invention to provide an improved system for controlling at least one wirelessly connected lighting device within a wireless network. Thereto, the invention further provides a system comprising: a wireless network comprising at least one wirelessly connected lighting device; the control device according to the invention. Thereby, advantages and/or embodiments applying to the control device according to the invention may mutatis mutandis apply to said system according to the invention.

In an embodiment, the system further comprises an artificial light source emitting said light signal. In an embodiment, said artificial light source may be one of: an incandescent light bulb, a fluorescent tube, a spotlight, a halogen spot, a LED light source, a TLED, or a pixilated LED spot. Furthermore, in an embodiment, the artificial light source may be a first artificial light source; wherein the at least one wirelessly connected lighting device is a second artificial light source; wherein the first artificial light source and the second artificial light source are different (i.e. e.g. different of a type).

It is a further object of the invention to provide an improved method of controlling at least one wirelessly connected lighting device within a wireless network. Thereto, the invention further provides, a method of controlling at least one wirelessly connected lighting device within a wireless network, the method being performed by a control device comprising a light sensor, processor and transceiver; wherein the method comprises: detecting, with the light sensor, a light signal comprising a temporal characteristic that is characteristic for a first artificial light source; analyzing, with the processor, said temporal characteristic to determine a first condition that the light signal belongs to the first artificial light source; transmitting, with the transceiver, a control message to the at least one wirelessly connected lighting device upon determining said first condition. Thereby, advantages and/or embodiments applying to the control device and/or system according to the invention may mutatis mutandis apply to said method according to the invention.

In a further embodiment, the method further comprises: overhearing, with the transceiver, the wireless network to determine a second condition that no message is transmitted within the wireless network within a time period prior to the moment of detecting said light signal, and transmitting, with the transceiver, the control message to the at least one wirelessly connected lighting device upon determining said first condition and said second condition.

The invention further relates to a computer program product. Hence, the invention provides a computer program product for a computing device, the computer program product comprising computer program code to perform the method(s) according to the invention when the computer program product is run on a processing unit of the computing device. Thus, aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

BRIEF DESCRIPTION OF THE DRAWINGS

The invention will now be further elucidated by means of the schematic non-limiting drawings.

DETAILED DESCRIPTION

As mentioned, the lighting industry experiences an ongoing pull to find new solutions and improved applications for controlling wirelessly connected lighting devices with a light sensor. This application leverages the insight that each particular light source may emit a light signal comprising a temporal characteristic particular to the (type of) artificial light source and/or its particular operation. An artificial light source may e.g. be a lamp or luminaire. Said temporal characteristic may for example result from a unique powering behavior for a respective light source and the temporal artefacts resulting therefrom, e.g. during start-up of said light source. A light sensor of a control device may receive a light signal comprising such a temporal characteristic. Therefore, the present invention provides new and advantageous solutions for controlling wirelessly connected lighting devices based on the (type of) the artificial light source determined via the detected light signal.

Figure 1:
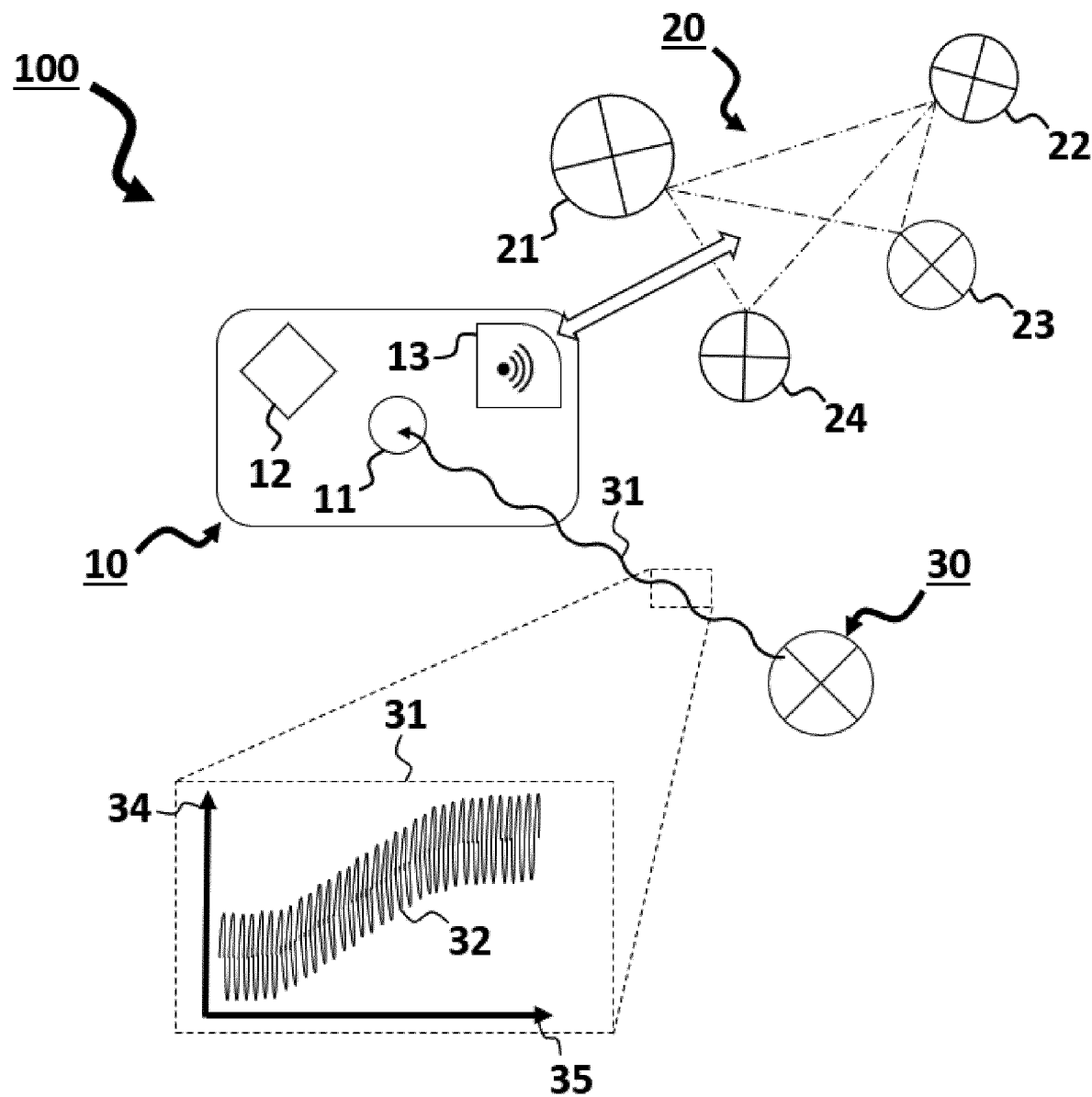
FIG. 1 depicts schematically an embodiment of a system according to the invention, wherein the system comprises a wireless network comprising at least one wirelessly connected lighting device, a control device and an artificial light source.

FIG. 1 depicts, by non-limiting example, an embodiment of a system 100 comprising a control device 10, a wireless network 20 and an artificial light source 30. The artificial light source 30 is a non-connected LED lamp, i.e. without wireless connectivity to a network. Thereby, the first the artificial light source 30 is a LED lamp. The artificial light source 30 emits a light signal 31. The light signal 31 comprises a temporal characteristic 32 which is characteristic for the first the artificial light source 30, i.e. e.g. characteristic for the type LED lamp. Alternatively, in other embodiments, said non-connected LED lamp is not connected to said wireless network, but may be a node of another wireless network.

Here, the temporal characteristic 32 is the start-up behavior of the LED lamp 30. The temporal characteristic 32 comprises a fluctuation of the light level 34 (or: ripple) of the emitted light signal 31 in time 35. Said fluctuation of the light level 34 is at a frequency of twenty Kilohertz, which may be indicative of an artificial light source, such as a LED lamp, or at least indicative for a LED lamp operated from mains with Pulse Width Modulation. Moreover, the temporal characteristic 32 comprises an increasing slope in the light level 34 towards a maximum light level while the light level is fluctuating at said frequency of twenty Kilohertz. Here, such an increasing slope is characteristic for the start-up behavior of said LED lamp. Similarly, in alternative examples, other types of light sources may be characterized by a fluctuation of the light level at respectively other frequencies, as indicated before.

The wireless network 20 comprises four wirelessly connected lighting devices 21, 22, 23, 24. Said artificial light source 30 is thus no part of the wireless network 20. The artificial light source 30 and the four wirelessly connected lighting devices 21, 22, 23, 24 are installed within a same optical space, such as a floor or space, and by e.g. taking into account transparent separations. The wireless network is a ZigBee network, but may alternatively be any other wireless modality, such as Wi-Fi, Bluetooth, VLC, Li-Fi, Lo-Ra, UWB, GSM, RF, or any combination thereof. The wirelessly connected lighting devices 21, 22, 23, 24 are connected LED lamps (such as e.g. Philips Hue bulbs).

The control device 10 is a wall switch. Alternatively, said control device may e.g. be part of a luminaire, be a sensor device, a remote control, or a bridge device. The control device 10 comprises a transceiver 13. The control device 10 controls the wirelessly connected lighting devices 21, 22, 23, 24 within the wireless network 20 by transmitting control messages within the wireless network 20. The control device 10 is also able to overhear the wireless network 20 (for messages transmitted therein) with said transceiver 13. The control device 10 further comprises a light sensor 11 and a processor 12. The light sensor 11, the processor 12 and the transceiver 13 are operatively coupled and function coherently.

The light sensor 11 detects the light signal 31 emitted by the artificial light source 30. As mentioned, the light signal 31 is characteristic for the non-connected LED lamp 30, i.e. the type LED lamp. The processor 12 analyzes said temporal characteristic 32, for example by evaluating the frequency of the light level 34 of the light signal 31 and/or the sloped start-up behavior, and identifies a first condition that the light signal 31 belongs to an artificial light source 30 having the type LED lamp.

Furthermore, the processor 12 overhears the wireless network 20 with the transceiver 13 and determines a second condition that no message is transmitted within the wireless network 20 within a time period of one second prior to the moment of detecting the light signal 31 of the non-connected LED lamp 30. Alternatively, said time period may be at most halve a second, fifty milliseconds, a millisecond, halve a millisecond or a quarter of a millisecond, e.g. depending on processing power of the processor and relative to the type of wireless network used. Upon determining the first condition and the second condition, the processor controls the transceiver to transmit a control message to the four wirelessly connected lighting devices 21, 22, 23, 24 within the wireless network 20. Alternatively, only one of said four wirelessly connected lighting devices may be addressed. In such an alternative example, the transceiver may also overhear the wireless network and determine the second condition that no message is transmitted to lighting device to be addressed. Moreover, for example, if another (type of) artificial light source is detected, as the first condition, such as e.g. a halogen or fluorescent tube, the control device may not take any action in the present embodiment.

Furthermore, here, the light signal 31 also comprises a light property of color. Namely, the non-connected LED lamp 30 (i.e. the artificial light source 30) emits a warm-white color (spectrum). Thereby, the processor 12 also determines, by analyzing the light signal 31, the light property of the non-connected LED lamp 30 being warm-white color (spectrum). Here, said control message comprises a command to adapt the color (spectrum) of the four wirelessly connected lighting devices 21, 22, 23, 24 within the wireless network 20 to warm-white as well. Thus, the control device advantageously controls the four wirelessly connected lighting devices 21, 22, 23, 24 within the wireless network 20 to copy the properties of the detected light signal 31 of the non-connected artificial light source 30.

In alternative embodiments, such copying behavior is not necessary and the processor may transmit a control message to the at least one wirelessly connected lighting device comprising a control message to adapt a lighting property of said at least one wirelessly connected lighting device, such as a light intensity, a light spectrum, a color, a color temperature, and/or a light scene.

Figure 2:
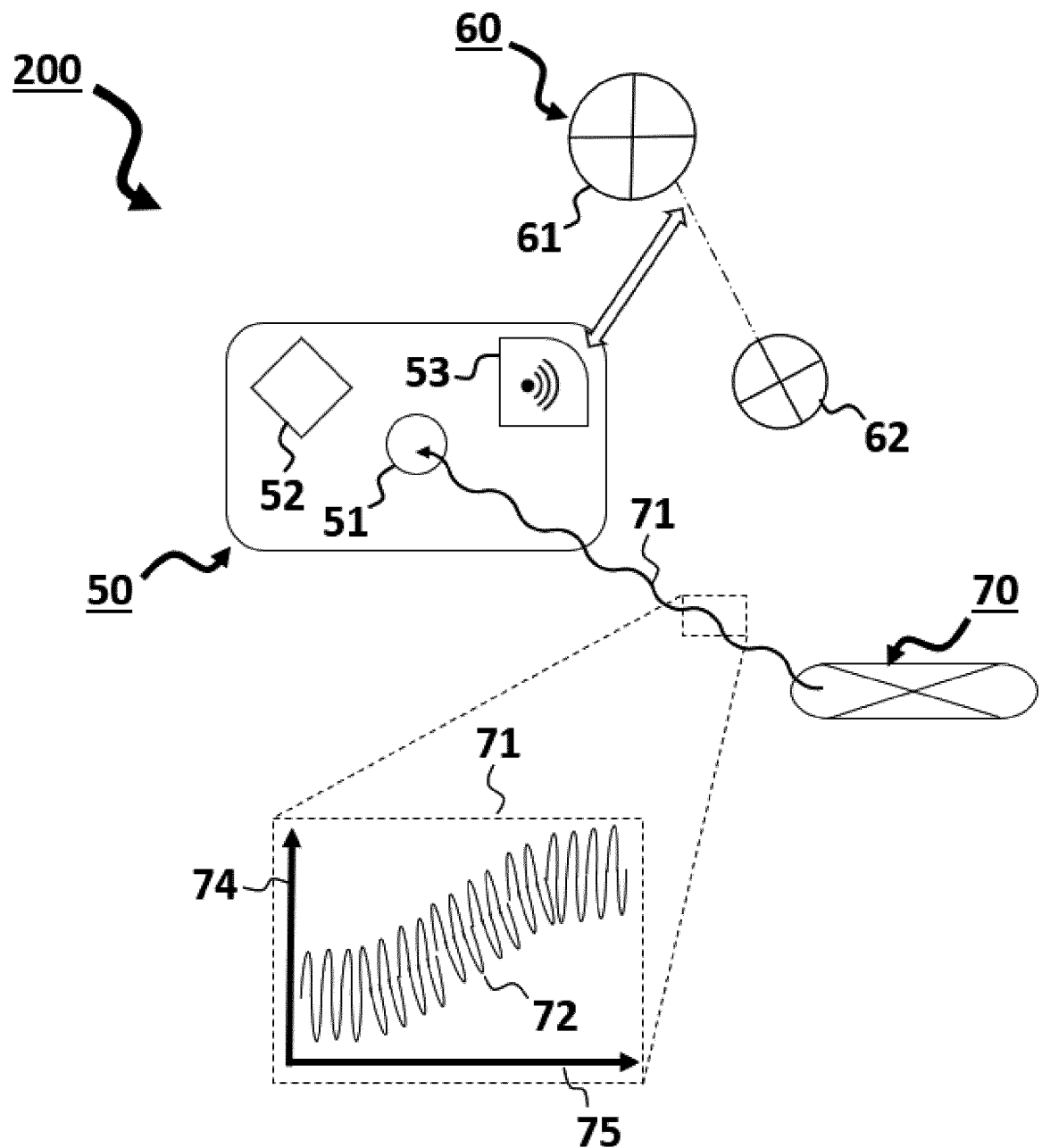
FIG. 2 depicts schematically another embodiment of a system according to the invention, wherein the system comprises a wireless network comprising at least one wirelessly connected lighting device, a control device and an artificial light source.

FIG. 2 depicts, by non-limiting example, an embodiment of a system 200 comprising a control device 50, a wireless network 60 and an artificial light source 70. The artificial light source 70 is a conventional incandescent lamp, i.e. without wireless connectivity to any network. Thereby, the first the artificial light source 70 is an incandescent lamp. The artificial light source 70 emits a light signal 71. The light signal 71 comprises a temporal characteristic 72 which is characteristic for the first artificial light source 70, i.e. characteristic for the type incandescent lamp 70. Alternatively, said incandescent lamp may e.g. be a fluorescent tube or halogen spot, etcetera.

Here, the temporal characteristic 72 is the start-up behavior of the incandescent lamp 70. The temporal characteristic 72 comprises a fluctuation of the light level 74 of the emitted light signal 71 in time 75. Said fluctuation of the light level 74 is at a smooth sinusoidal frequency of hundred Hertz, twice the mains frequency, which is indicative of said incandescent lamp 70. Moreover, the temporal characteristic 72 comprises an increasing slope in the light level 74 towards a maximum light level while the light level 74 is fluctuating at said frequency of hundred Hertz. Here, such an increasing slope is characteristic for the start-up behavior of said incandescent lamp 70. Such a start-up behavior is not essential to detect the first type of the lamp, as in alternative examples said fluctuation may suffice. Similarly, in alternative examples, other types of light sources may be characterized by a fluctuation of the light level at respectively other frequencies, as indicated before.

The wireless network 60 comprises two wirelessly connected lighting devices 61, 62. Said artificial light source 70 is thus no part of the wireless network 60. The artificial light source 70 (the incandescent lamp 70) and the two wirelessly connected lighting devices 61, 62 are installed within a shop window, wherein thus not all the lighting devices are connected (which may be common in business and home environments as customers of lighting devices first install a few connected lighting devices in addition to their conventional lighting devices before a full overhaul to connected lighting). The wireless network is a Bluetooth network, but may alternatively be any other wireless modality, such as Wi-Fi, ZigBee, VLC, Li-Fi, Lo-Ra, UWB, GSM, RF, or any combination thereof. The wirelessly connected lighting devices 61, 62 are connected LED lamps (such as e.g. Philips Hue bulbs). Therefore, the wirelessly connected lighting devices 61, 62 are also artificial light sources, but of a second type of artificial light source.

Because the control of the two wirelessly connected lighting devices 61, 62 and the control of the non-connected incandescent lamp 70 requires two separate controlling means, e.g. wall switch for the latter and a smartphone for the former, the installed lighting in the shop window may be considered cumbersome and less ergonomic.

Still referring to the embodiment depicted in FIG. 2, the control device 50 is a sensor device. Alternatively, said control device may e.g. be a part of a luminaire, a switch, a wall switch, a remote control, or a bridge device. The control device 50 comprises a transceiver 53. The control device 50 controls the wirelessly connected lighting devices 61, 62 within the wireless network 60 by transmitting control messages within the wireless network 60. The control device 60 is also able to overhear the wireless network 60 (for messages transmitted therein) with said transceiver 53. The control device 50 further comprises a light sensor 51 and a processor 52. The light sensor 51, the processor 52 and the transceiver 53 are operatively coupled and function coherently.

The light sensor 51 detects the light signal 71 emitted by the artificial light source 70. As mentioned, the light signal 71 is characteristic for the (type of the) (non-connected) incandescent lamp 70. The processor 52 analyzes said temporal characteristic 72, for example by evaluating the frequency of the light level 74 of the light signal 71 and/or the sloped start-up behavior, and identifies a first condition that the light signal 71 belongs to an artificial light source 71 having the type incandescent lamp. Upon determining the light signal 71 belongs to the type incandescent lamp, the processor 52 transmits a control message to the two wirelessly connected lighting devices 61, 62 within the wireless network 60, wherein the control message comprises a command to turn on (or alternatively off) said wirelessly connected lighting devices 61, 62. Therefore, upon determining said first condition that the first light signal 71 belongs to a first (type of) incandescent lamp, the wirelessly connected lighting devices 61, 62 are automatically turned on (of off); thereby providing a more ergonomic control of the lighting devices within the shop window since the connected lights turn on (or off) upon determining the non-connected lamp is turned on (with the wall switch).

In alternative embodiments, the control message may comprise a command to adapt another light property of the wirelessly connected lighting device, such as e.g. light intensity, a light spectrum, a color, a color temperature, and/or a light scene.

Figure 3:
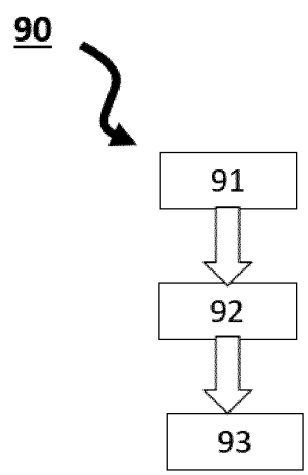
FIG. 3 depicts schematically a method according to the invention.

FIG. 3 depicts schematically, by non-limiting example, a method 90 of controlling a wirelessly connected lighting device within a wireless network. The method 90 is performed by a control device comprising a light sensor, processor and transceiver; such as e.g. the control device of the embodiments depicted in FIG. 1 and FIG. 2. The method 90 comprises a first step 91 of detecting, with the light sensor, a light signal comprising a temporal characteristic that is characteristic for a first (type of) artificial light source.

For example, an activation of a particular (type of) artificial light source may be detected by the fluctuation of the light level, which may either be at a low frequency related to the 50 or 60 Hertz of the power grid, or as high as 300 Kilohertz related to power characteristics originating from the LED driver. Moreover, conventional fluorescent light bulbs may typically flicker at twice the mains frequency. Moreover, power electronics in a LED bulb may use Switch Mode Power Supply (SMPS) circuits that may operate typically in the range from 30 Kilohertz to 4 Megahertz. Moreover, dimming of LED bulbs using Pulse Width Modulation (PWM) in the frequency range between 200 Hertz to 100 Kilohertz may result in a current ripple that results in a fluctuation of the light level of the corresponding emitted light signal. The method 90 comprises a second step 92 of analyzing, with the processor, said temporal characteristic to determine a first condition that the light signal belongs to the first (type of) artificial light source.

Furthermore, the method 90 comprises a third step 93 of transmitting, with the transceiver, a control message to the at least one wirelessly connected lighting device upon determining said first condition. The control message may thereby comprise a command to adapt a light property of the at least one wirelessly connected lighting device, such as at least one of: a light intensity, a light spectrum, a color, a color temperature, and/or a light scene.

In a further embodiment, not depicted, the method further comprises a step of overhearing, with the transceiver, the wireless network to determine a second condition that no message is transmitted within the wireless network within a time period prior to the moment of detecting said light signal, and transmitting, with the transceiver, the control message to the at least one wirelessly connected lighting device upon determining said first condition and said second condition.

The invention claimed is:

1. A control device for controlling at least one wirelessly connected lighting device within a wireless network, wherein the control device comprises:
    a transceiver configured to overhear and transmit a message within the wireless network;
    a light sensor configured to detect a light signal comprising a temporal characteristic that is characteristic for an first artificial light source;
    a processor operatively coupled to the light sensor and the transceiver, wherein the processor is configured to:
        determine, based on analyzing said temporal characteristic, a first condition that the light signal belongs to the first artificial light source, and
        wherein the processor is configured to:
        determine, by overhearing the wireless network with the transceiver, a second condition that no control message is transmitted within the wireless network within a time period prior to the moment of detecting said light signal, and
        transmit a control message to the at least one wirelessly connected lighting device upon determining said first condition and said second condition.

2. The control device according to claim 1, wherein the time period is at most 1 second.

3. The control device according to claim 1, wherein the at least one wirelessly connected lighting device is a second artificial light source, wherein the first artificial light source and the second artificial light source are different.

4. The control device according to claim 1, wherein the control message comprises a command to turn on or off the at least one wirelessly connected lighting device.

5. The control device according to claim 1, wherein the control message comprises a command to adapt a light property of the at least one wirelessly connected lighting device.

6. The control device according to claim 5, wherein said light property is at least one of: a light intensity, a light spectrum, a color, a color temperature, and/or a light scene.

7. The control device according to claim 1, wherein the light signal comprises a first light property;
- wherein the processor is configured to determine said first light property of the light signal;
- wherein the control message comprises a command to adapt the light property of the at least one wirelessly connected lighting device to the first light property of the light signal.

8. The control device according to claim 1, wherein the temporal characteristic comprises at least one fluctuation of a light level at a particular frequency.

9. The control device according to claim 8, wherein the particular frequency is at least one of: a mains frequency, a frequency of 50 Hertz, a frequency of 60 Hertz, a frequency between 100 Hertz and 120 Hertz, a frequency between 30 Kilohertz and 1 Megahertz, a frequency between 200 Hertz and 100 Kilohertz, and/or a frequency between 300 Hertz and 100 Kilohertz.

10. The control device according to claim 1, wherein the control device is a light switch, a wall switch, a sensor device, or a bridge device.

11. A system comprising:
- a wireless network comprising at least one wirelessly connected lighting device; and
- the control device according to claim 1.

12. The system according to claim 11 further comprising:
- an artificial light source emitting said light signal.

13. A method of controlling at least one wirelessly connected lighting device within a wireless network, the method being performed by a control device comprising a light sensor, processor and transceiver; wherein the method comprises:
- detecting, with the light sensor, a light signal comprising a temporal characteristic that is characteristic for a first artificial light source;
- analyzing, with the processor, said temporal characteristic to determine a first condition that the light signal belongs to the first artificial light source;
- overhearing, with the transceiver, the wireless network to determine a second condition that no message is transmitted within the wireless network within a time period prior to the moment of detecting said light signal, and
- transmitting, with the transceiver, the control message to the at least one wirelessly connected lighting device upon determining said first condition and said second condition.

\* \* \* \* \*